US012688513B2

(12) United States Patent
Xu et al.

(10) Patent No.: US 12,688,513 B2
(45) Date of Patent: Jul. 21, 2026

(54) METHOD AND APPARATUS FOR PREDICTING CANCELLATIONS OF RESERVATION SERVICES BASED ON FUSION OF MULTI-SCALE TIME SERIES FEATURES

(71) Applicant: Zhejiang University of Science and Technology, Hangzhou City (CN)

(72) Inventors: Wenjian Xu, Hangzhou City (CN); Lei Zhang, Hangzhou City (CN); Junjun Ning, Hangzhou City (CN); Yuyang Ji, Hangzhou City (CN); Jian Wan, Hangzhou City (CN)

(73) Assignee: Zhejiang University of Science and Technology, Hangzhou City (CN)

( * ) Notice: Subject to any disclaimer, the term of this patent is extended or adjusted under 35 U.S.C. 154(b) by 130 days.

(21) Appl. No.: 18/921,754

(22) Filed: Oct. 21, 2024

(65) Prior Publication Data

US 2026/0050938 A1     Feb. 19, 2026

(30) Foreign Application Priority Data

Aug. 14, 2024     (CN) .......................... 202411120291.8

(51) Int. Cl.
        *G06Q 30/0202*        (2023.01)
        *G06F 18/25*        (2023.01)
(52) U.S. Cl.
        CPC ....... *G06Q 30/0202* (2013.01); *G06F 18/253* (2023.01)
(58) Field of Classification Search
        None
        See application file for complete search history.

(56) References Cited

U.S. PATENT DOCUMENTS

2023/0385254 A1 * 11/2023 Cheng ................. G06F 16/2474

OTHER PUBLICATIONS

Hsieh, Tsung-Yu, et al. "Explainable multivariate time series classification: a deep neural network which learns to attend to important variables as well as time intervals." Proceedings of the 14th ACM international conference on web search and data mining. 2021 (Year: 2021).*

* cited by examiner

*Primary Examiner* — George Chen
(74) *Attorney, Agent, or Firm* — Reising Ethington, P.C.

(57)        ABSTRACT

Provided are a method and an apparatus for predicting cancellations of reservation services based on fusion of multi-scale time series features, relating to the field of predicting cancellations of reservation services. The method includes: obtaining reservation feature data of a reservation service order to be predicted, where the reservation feature data includes service provider feature information, user reservation feature information, statistical time series data, and statistical non-time series data; performing multi-scale time series feature fusion on various time series in the statistical time series data, and inputting fused data, together with other reservation feature data, into a multi-task learning prediction network for cancellation prediction. The multi-task learning prediction network includes a main cancellation prediction model and an auxiliary rejection prediction model. This application can accurately predict whether a reservation service order to be predicted is canceled during service.

20 Claims, 4 Drawing Sheets

Figure 1:
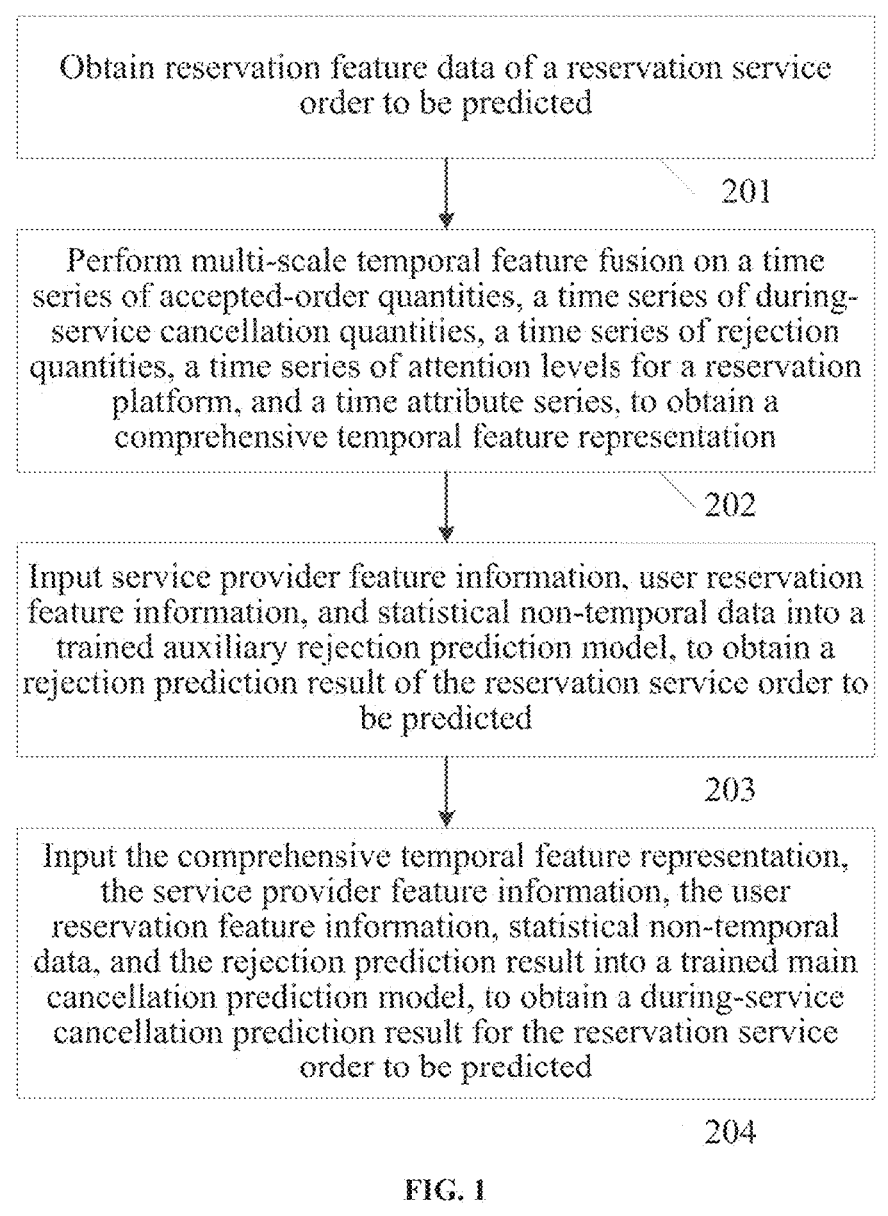

Obtain reservation feature data of a reservation service
order to be predicted

201

Perform multi-scale temporal feature fusion on a time
series of accepted-order quantities, a time series of during-
service cancellation quantities, a time series of rejection
quantities, a time series of attention levels for a reservation
platform, and a time attribute series, to obtain a
comprehensive temporal feature representation

202

Input service provider feature information, user reservation
feature information, and statistical non-temporal data into a
trained auxiliary rejection prediction model, to obtain a
rejection prediction result of the reservation service order to
be predicted

203

Input the comprehensive temporal feature representation,
the service provider feature information, the user
reservation feature information, statistical non-temporal
data, and the rejection prediction result into a trained main
cancellation prediction model, to obtain a during-service
cancellation prediction result for the reservation service
order to be predicted

METHOD AND APPARATUS FOR PREDICTING CANCELLATIONS OF RESERVATION SERVICES BASED ON FUSION OF MULTI-SCALE TIME SERIES FEATURES

CROSS REFERENCE TO RELATED APPLICATION

This patent application claims the benefit and priority of Chinese Patent Application No. 2024111202918, filed with the China National Intellectual Property Administration on Aug. 14, 2024, the disclosure of which is incorporated by reference herein in its entirety as part of the present application.

TECHNICAL FIELD

The present disclosure relates to the field of predicting cancellations of reservation orders, and in particular to a method and an apparatus for predicting cancellations of reservation services based on fusion of multi-scale time series features.

BACKGROUND

In many service industries, it is common for reservations to be canceled unexpectedly. For example, customers who book car rental services through platforms like Meituan or Airbnb may be told there are no available vehicles at the time of use, or customers who reserve tables at restaurants may find out there are no available seats upon arrival. These cancellations can reduce user satisfaction and affect the reputation of service providers, leading to customer attrition. Therefore, there is an urgent need for a method that can accurately predict cancellations of reservation service orders.

SUMMARY

An objective of the present disclosure is to provide a method and an apparatus for predicting cancellations of reservation services based on fusion of multi-scale time series features, which can accurately predict whether reservation service orders will be canceled during service.

To achieve the above objective, the present disclosure provides the following technical solutions.

According to a first aspect, the present disclosure provides a method for predicting cancellations of reservation services based on fusion of multi-scale time series features, including:

obtaining reservation feature data of a reservation service order to be predicted, where the reservation feature data includes service provider feature information, user reservation feature information, statistical time series data, and statistical non-time series data; the statistical time series data includes a time series of accepted-order quantities, a time series of during-service cancellation quantities, a time series of rejection quantities, a time series of attention levels for a reservation platform, and a time attribute series, that are all within a first preset time period prior to a reservation service time point of the reservation service order to be predicted, where a time attribute refers to a combination of a day of a week and whether it is a holiday or not; and the statistical non-time series data includes total order quantities, total during-service cancellation quantities, total rejection quantities, and total attention levels for the reservation platform, all within a second preset time period prior to the service time point of the reservation order to be predicted;

performing multi-scale time series feature fusion on the time series of accepted-order quantities, the time series of during-service cancellation quantities, the time series of rejection quantities, the time series of attention levels for the reservation platform, and the time attribute series, to obtain a comprehensive time series feature representation;

inputting the service provider feature information, the user reservation feature information, and the statistical non-time series data into a trained auxiliary rejection prediction model of a multi-task learning prediction network, to obtain a rejection prediction result of the reservation service order to be predicted; and inputting the comprehensive time series feature representation, the service provider feature information, the user reservation feature information, the statistical non-time series data, and the rejection prediction result into a trained main cancellation prediction model of the multi-task learning prediction network, to obtain a during-service cancellation prediction result for the reservation service order to be predicted, where the auxiliary rejection prediction model and the main cancellation prediction model are machine learning models.

According to a second aspect, the present disclosure provides a computer device, including a memory, a processor, and a computer program stored in the memory and executable on the processor, where the processor executes the computer program to implement the method for predicting cancellations of reservation services based on fusion of multi-scale time series features.

According to a third aspect, the present disclosure provides a computer readable storage medium storing a computer program, where the computer program, when executed by a processor, implements the method for predicting cancellations of reservation services based on fusion of multi-scale time series features.

According to a fourth aspect, the present application provides a computer program product, including a computer program, where the computer program, when executed by a processor, implements the method for predicting cancellations of reservation services based on fusion of multi-scale time series features.

According to specific embodiments provided in the present disclosure, the present disclosure discloses the following technical effects:

The present disclosure provides a method and an apparatus for predicting cancellations of reservation services based on fusion of multi-scale time series features. In the first aspect, cancellations are predicted using reservation feature data of reservation service orders, where the reservation feature data includes service provider feature information, user reservation feature information, statistical time series data, and statistical non-time series data; and the statistical time series data and the statistical non-time series data include indicators such as order quantity, quantity of during-service cancellations, rejection quantity, and attention level of the reservation platform. Various indicators from reservation service orders are used for prediction of cancellations, ensuring that the feature data is comprehensive and thereby improving the accuracy of the prediction results. In the second aspect, multi-scale time series feature fusion further performed on the corresponding time series of various indicators in the statistical time series data to high-light data features through feature fusion, thereby further enhancing prediction accuracy. In the third aspect, the present disclosure further introduces a multi-task learning prediction network, and the auxiliary rejection prediction model is used for supplementary predictions, which effectively improves the accuracy of the main cancellation prediction model.

BRIEF DESCRIPTION OF THE DRAWINGS

To describe the technical solutions in the embodiments of the present disclosure or in the prior art more clearly, the following briefly describes the accompanying drawings required for the embodiments. Apparently, the accompanying drawings in the following description show merely some embodiments of the present disclosure, and a person of ordinary skill in the art may still derive other accompanying drawings from these accompanying drawings without creative efforts.

FIG. 1 is a schematic flowchart of a method for predicting cancellations of reservation services based on fusion of multi-scale time series features according to an embodiment of the present disclosure;

DETAILED DESCRIPTION OF THE EMBODIMENTS

The technical solutions in the embodiments of the present disclosure are clearly and completely described below with reference to the drawings in the embodiments of the present disclosure. Apparently, the described embodiments are only some rather than all of the embodiments of the present disclosure.

Embodiment 1

Figure 2:
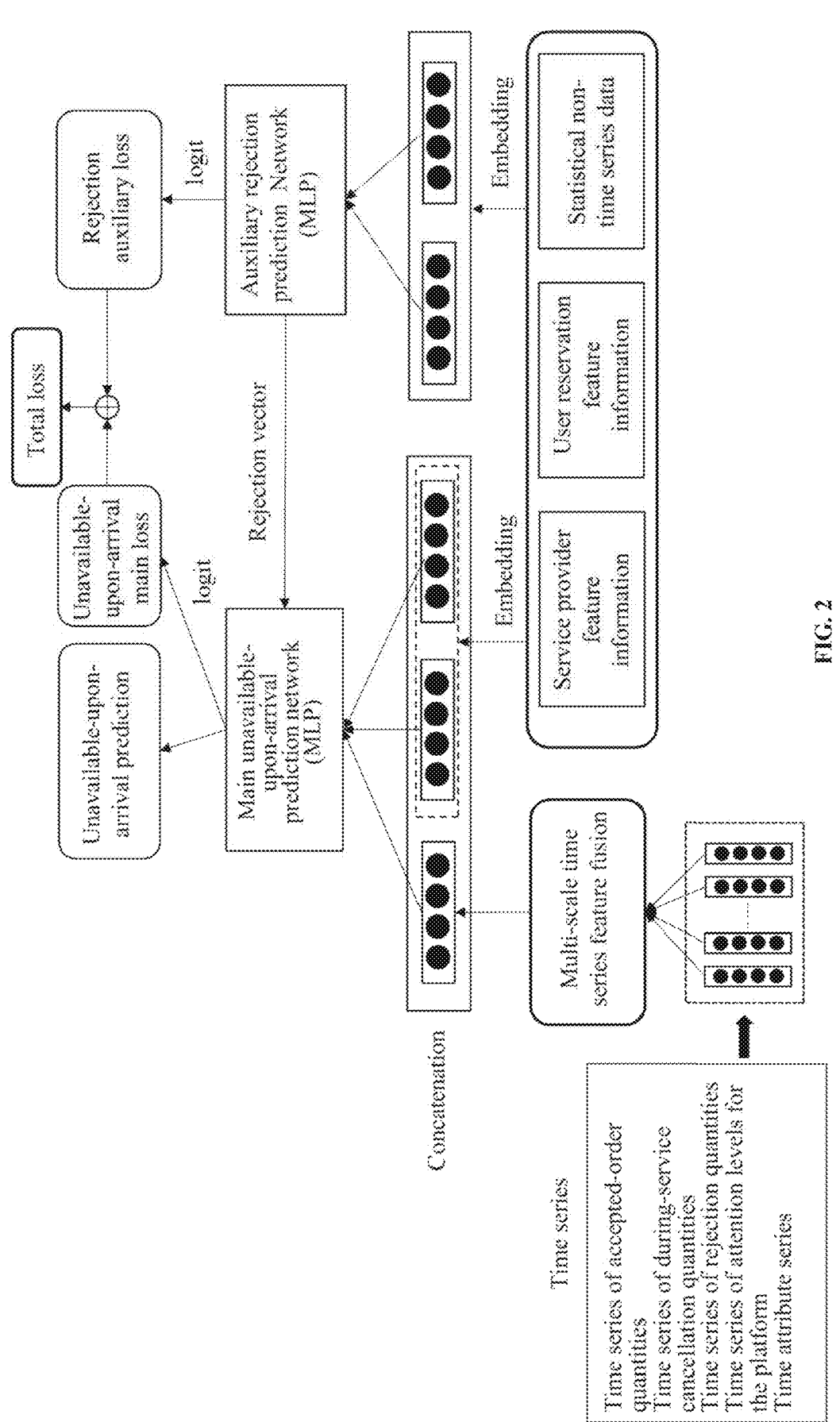
FIG. 2 is a schematic diagram of technical conception of a method for predicting cancellations of reservation services based on fusion of multi-scale time series features according to an embodiment of the present disclosure.

As shown in FIG. 1 and FIG. 2, this embodiment provides a method for predicting cancellations of reservation services based on fusion of multi-scale time series features, including step 201 to step 204 as follows.

Step 201: Obtain reservation feature data of a reservation service order to be predicted, where the reservation feature data includes service provider feature information, user reservation feature information, statistical time series data, and statistical non-time series data.

The reservation feature data of the reservation service order can be obtained by integrating relevant data from an online booking service platform, a service provider management system, and an external data source (such as local event arrangements).

The service provider feature information includes the service price, rating, brand, and type of a service provider (for example, where the service provider is a direct sales/self-operated provider), the city and business area where the service provider is located, the scale of the service provider, and the like. The user reservation feature information includes the number of days in advance the reservation is made, the service time reserved (in hours if the service provider is a hotel), the day of the week for the service, whether it is a holiday or coincides with a local event day. The statistical time series data includes a time series of accepted-order quantities, a time series of during-service cancellation quantities, a time series of rejection quantities, a time series of attention levels for a reservation platform, and a time attribute series, all within a first preset time period prior to a reservation service time point of the reservation service order to be predicted; and the statistical non-time series data includes total order quantities, total during-service cancellation quantities, total rejection quantities, and total attention levels for the reservation platform, all within a second preset time period prior to the service time point of the reservation order to be predicted. The first preset time period and the second preset time period can be determined based on actual needs. As an example, the statistical time series data includes total accepted-order quantities, total cancellation quantities, total rejection quantities, and total attention levels for the service provider, collected on each day over a continuous 28-day period, corresponding to the previous Jan. 7, 1930/90 days, as well as corresponding time attribute series. Using the accepted-order quantity as an example, the Jan. 7, 1930/90 days correspond to four time series of accepted-order quantities. As another example, the statistical non-time series data includes total accepted-order quantities, total cancellation quantities, total rejection quantities, and total attention levels for the service provider within Jan. 7, 1930/90 days prior to the service time point of the reservation service order. Using the accepted-order quantity as an example, the Jan. 7, 1930/90 days correspond to four total accepted-order quantities. For the 28 days and Jan. 7, 1930/90 days mentioned herein, specific values can be configured as needed, and the values here merely serve as examples but not restrictions. The accepted-order quantity refers to the number of reservation service orders agreed upon by the service provider; the during-service cancellation quantity refers to the number of reservation service orders agreed upon by the service provider and then canceled by the service provider before service; and the historical rejection quantity refers to the number of reservation service orders that are not agreed upon by the service provider. The attention level for the reservation platform refers to the frequency with which the service provider maintains the reservation inventory on the reservation platform.

Step 202: Perform multi-scale time series feature fusion on the time series of accepted-order quantities, the time series of during-service cancellation quantities, the time series of rejection quantities, the time series of attention levels for the reservation platform, and the time attribute series, to obtain a comprehensive time series feature representation.

Step 203: Input the service provider feature information, the user reservation feature information, and the statistical non-time series data into a trained auxiliary rejection prediction model, to obtain a rejection prediction result of the reservation service order to be predicted.

Figure 3:
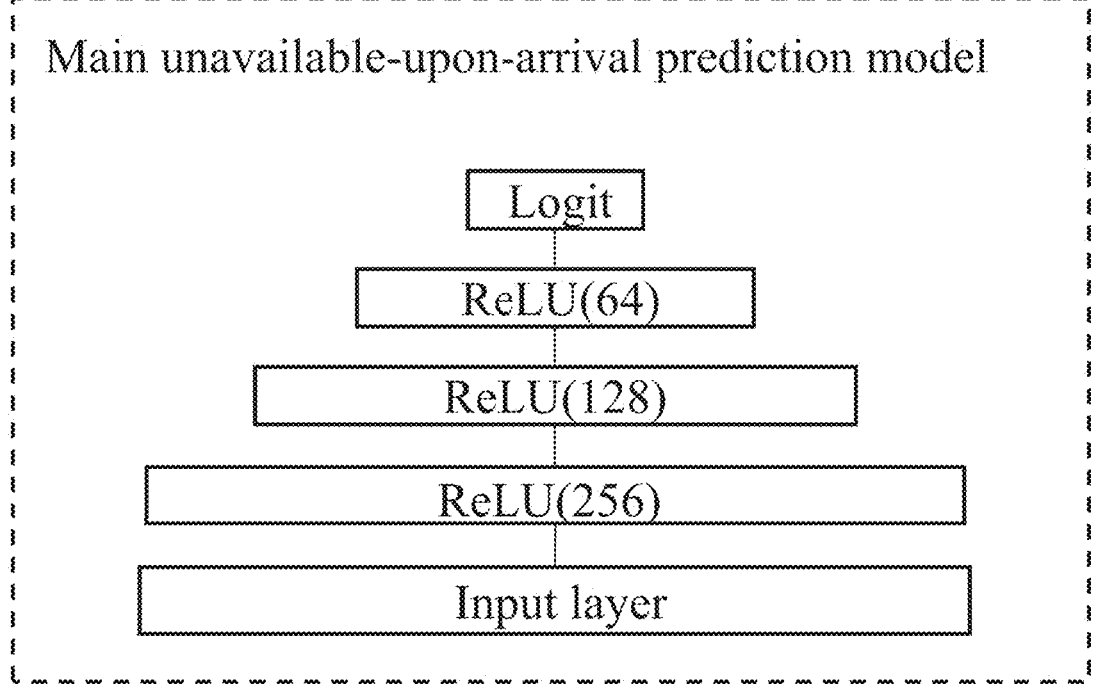
FIG. 3 is a structural diagram of a main cancellation prediction model according to an embodiment of the present disclosure.

Step 204: Input the comprehensive time series feature representation, the service provider feature information, the user reservation feature information, the statistical non-time series data, and the rejection prediction result (corresponding to the rejection vector in FIG. 2) into a trained main cancellation prediction model, to obtain a during-service cancellation prediction result for the reservation service order to be predicted (corresponding to unavailable-uponarrival prediction in FIG. 2). The main cancellation prediction model and the auxiliary rejection prediction model are machine learning models, such as a Multi-Layer Perceptron (MLP). FIG. 3 illustrates a structure of the main cancellation prediction model (the unavailable-upon-arrival prediction main model), which mainly includes three ReLU layers. Before various input data are into the auxiliary rejection prediction model and the main cancellation prediction model, data concatenation is required.

Figure 4:
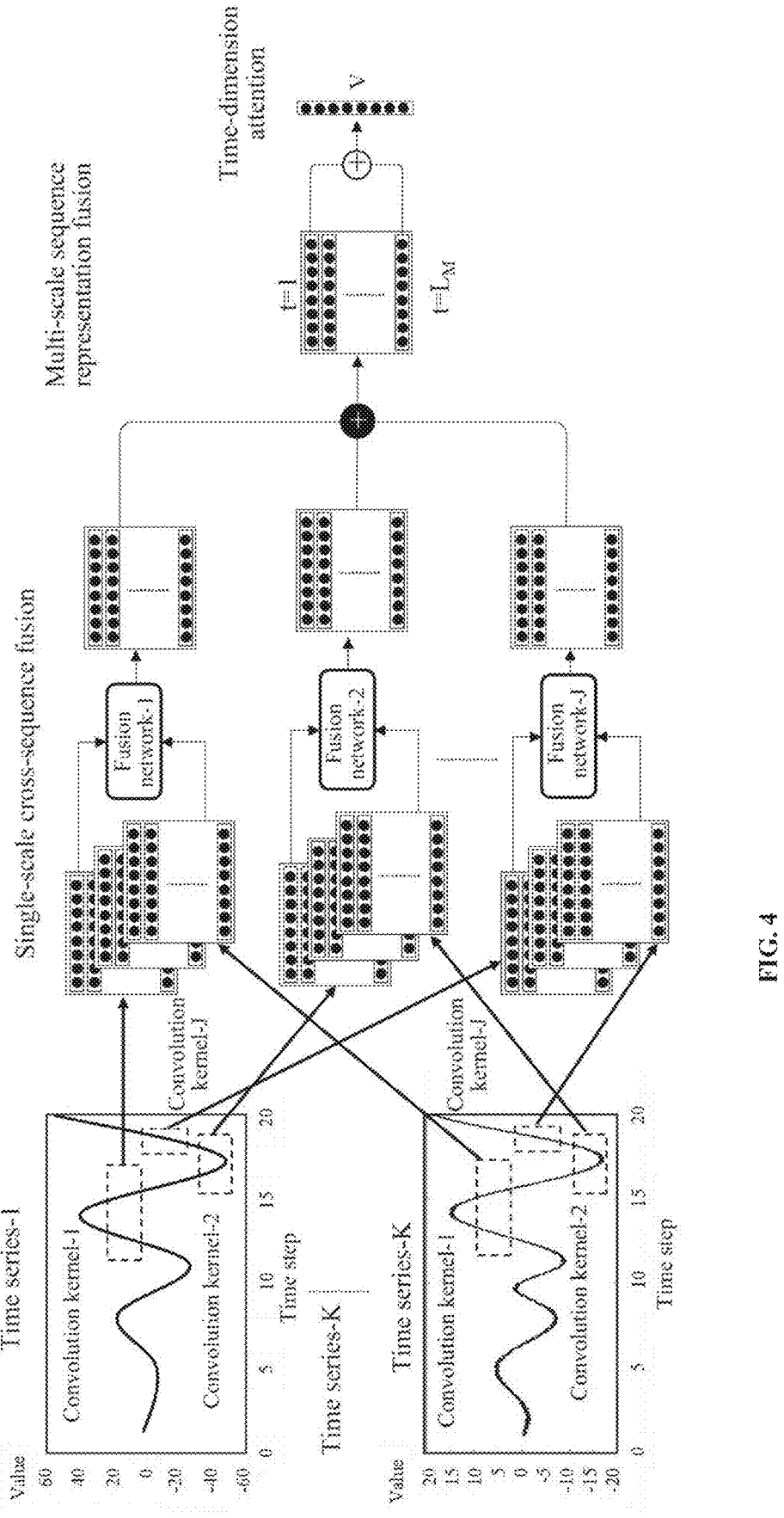
FIG. 4 is a schematic diagram of a fusion process of multi-scale time series features for various time series in statistical time series data according to an embodiment of the present disclosure.

In another exemplary embodiment of the present disclosure, as shown in FIG. 4, the multi-scale time series feature fusion in step 202 includes three processes: single-scale cross-sequence fusion, multi-scale representation fusion, and time-based attention representation processing.

(1) Single-Scale Cross-Sequence Fusion

The single-scale cross-sequence fusion begins by using J different convolution kernels to extract features from each time series, followed by fusing output matrices from different time series under the same convolution kernel. The time series are represented in a curve format, as illustrated in FIG. 4, where the horizontal axis of the curve corresponding to the time series represents the time step, and the vertical axis indicates indicator values of different types of time series, such as an accepted-order quantity value, a cancellation quantity value, and a rejection quantity value, represented in FIG. 4 as "Value".

Specifically, the time series of accepted-order quantities, the time series of during-service cancellation quantities, the time series of rejection quantities, the time series of attention levels for the reservation platform, and the time attribute series are represented using $S=(s_1, s_2, \ldots, s_i, \ldots, s_K)$, and are processed sequentially as follows:

A. Multi-scale sequence representation extraction For each time series $s_i$, a one-dimensional convolution of a specified scale is applied. One-dimensional convolution kernels of specified sizes are used to extract features at multiple time series scales from the time series $s_i$, and capture features at each scale. One-dimensional convolution kernels of J different sizes are used for the time series $s_i$, where $CNN_{ij}$ represents j-th convolution kernels applied to the time series $s_i$, with the convolution kernel sizes being pre-defined integer values. For example, one-dimensional convolution kernels of sizes 3, 7, 14, and 28 are used. Each time series $s_i$ uses the same number of convolution kernels, and convolution kernels of the same sizes are shared among different time series. This can be formally expressed as follows:

$$C_{ij} = CNN_{ij}(s_i);$$

$$M(CNN_{1j}) = M(CNN_{2j}) = \ldots = M(CNN_{Kj});$$

$$C_{ij} \in R^{\tilde{L}_j \times C}, i = 1, 2, \ldots, K, j = 1, 2, \ldots, J;$$

where $C_{ij}$ represents a feature matrix (that is, a convolution result matrix) for the time series $s_i$ under a j-th convolution kernel, the feature matrix having $\tilde{L}_j$ rows and C columns; C represents the number of output dimensions of the convolution (that is, the number of output channels, with all convolution operations being configured with the same number of output dimensions), and $\tilde{L}_j$ represents the number of steps that the j-th convolution kernel slides over the time series $s_i$; Output in each row of the feature matrix corresponds to a time step/time interval, where a row in the matrix represents a convolution output vector of a specific time series feature in a specific time interval under the sliding of a specific convolution kernel. M(•) indicates the size of the convolution kernel (which is an integer value for one-dimensional convolutions).

B. Same-scale cross-sequence representation fusion Convolution result matrices for all time series under the same convolution kernel size are obtained. All convolution result matrices for the j-th convolution kernels are denoted as follows:

$$H_j = (C_{1j}, C_{2j}, \ldots, C_{Kj}); H_j \in R^{\tilde{L}_j \times P}, P = K * C;$$

Next, same-scale fusion is performed, which results in a single-scale fusion matrix $G_j$ for each scale (convolution kernel), where the specific fusion operation employs an MLP network. Each scale corresponds to an independent fusion network, and the same-scale fusion representation is as follows:

$$G_j = MLP(H_j); G_j \in R^{\tilde{L}_j \times C}, j = 1, 2, \ldots, J;$$

(2) Multi-Scale Sequence Representation Fusion

The multi-scale sequence representation fusion primarily fuses the single-scale fusion matrices obtained from single-scale cross-sequence fusion in (1). Since the convolution kernels are of different sizes, $G_j$ (the number of steps, i.e., the number of time intervals, slid by the j-th convolution kernel) under different convolution kernels have different row counts. Therefore, a padding operation is performed to ensure that all matrices reach the maximum row count $L_M$. The padded fusion matrix $\tilde{G}_j$ is represented as follows:

$$\tilde{G}_j = \text{padding}(G_j, L_M)$$

$$L_M = \text{MAX}(L_j)$$

$$\tilde{G}_j \in R^{L_M \times C}, j = 1, 2, \ldots, J$$

Subsequently, the attention mechanism is employed to fuse the sequence fusion representations of multiple scales, yielding a comprehensive time series representation $\tilde{S}$ of the multi-dimensional time series.

The padded fusion matrix $\tilde{G}_j$ is represented as follows: $\tilde{G}_j = (\tilde{g}_{1j}, \tilde{g}_{2j}, \ldots, \tilde{g}_{tj}, \ldots, \tilde{g}_{L_{Mj}})$, where $\tilde{g}_{tj} \in R^C$, representing the feature vector of the fusion matrix corresponding to the j-th convolution kernel at time step/time interval t. From the matrix $\tilde{G}_j$, the matric $\hat{G}_t$ is obtained. The matrix, expressed as $\hat{G}_t = (\tilde{g}_{t1}, \tilde{g}_{t2}, \ldots, \tilde{g}_{tj}, \ldots, \tilde{g}_{tJ})$, $\hat{G}_t \in R^{J \times C}$, is a cross-scale combined matrix formed by combining the t-th row vector from each $\tilde{G}_j$, representing multi-scale features over a specific time interval.

Using the attention mechanism, cross-scale fusion is performed on multiple cross-scale combined matrices, to obtain a cross-scale fusion matrix $\tilde{S}$, which can be formally expressed as follows:

$$\text{Let } \tilde{S} = (\tilde{s}_1, \tilde{s}_2, \ldots, \tilde{s}_t, \ldots, \tilde{s}_{L_M}), \tilde{s}_t \in R^C;$$

-continued $$\hat{s}_t = \sum\nolimits_{j=1}^{J} \alpha_{tj} \hat{g}_{tj};$$

$$\alpha_t = \text{softmax}(\text{score}_t);$$

$$\text{score}_t = f_2\left(f_1\left(W_1\hat{G}_t + B_1\right)W2 + B_2\right);$$

where $\alpha_t = (\alpha_{t1}, \alpha_{t2}, \ldots, \varphi_{tJ})$, $W_1 \in R^{1 \times J}$, $B_1 \in R^{1 \times C}$, $W_2 \in R^{C \times J}$, $B_2 \in R^{1 \times J}$, and $W_1$, $B_1$, $W_2$, $B_2$ represent weight coefficients. $f_1(\bullet)$ and $f_2(\bullet)$ are activation functions, such as ReLU or tanh.

(3) Comprehensive Time Series Feature Representation Based on Time Dimension Attention After the cross-scale fusion matrix $\tilde{S}$ is obtained in (2), the attention mechanism is used at the time dimension to capture time periods that reflect time series trending characteristics, resulting in the comprehensive time series feature representation V. For the use of the attention mechanism at the time dimension, reservation feature information, such as the number of days in advance for booking, order time (in hours), day of the week for service, and whether it is a holiday, is used as Query. The Query is represented as $Q \in R^q$, and the detailed computation is as follows:

$$V = \sum\nolimits_{t=1}^{L_M} \beta_t \tilde{s}_t;$$

$$\beta = \text{softmax}(z), \beta = (\beta_1, \beta_2, \ldots, \beta_{L_M});$$

$$z = MLP\left(\text{concat}(\tilde{S}, \tilde{Q})\right), z \in R^{L_M \times 1};$$

$$\tilde{Q} = [Q] * L_M, \tilde{Q} \in R^{L_M \times q};$$

where concat( ) represents concatenation, and MLP represents a perceptron. The Concat operation in the formula for calculating z requires that $\tilde{S}$ and $\tilde{Q}$ have the same number of rows; $\tilde{S}$ is a matrix with $L_M$ rows and C columns, while Q is merely a vector with 1 row and q columns. Therefore, in this case, the vector needs to be replicated $L_M$ times to obtain a matrix $\tilde{Q}$ with $L_M$ rows and q columns.

In another exemplary embodiment of the present disclosure, before step 203 of inputting the service provider feature information, the user reservation feature information, and the statistical non-time series data into the trained auxiliary rejection prediction model, the method further includes: training a multi-task learning prediction network, where the multi-task learning prediction network includes the main cancellation prediction model and the auxiliary rejection prediction model. The training process specifically includes:

(b1) Obtain a historical reservation service order sample set and label data corresponding to each historical reservation service order sample, where the label data includes booking labels and service labels: the booking labels include "booking successful" and "booking unsuccessful"; the service labels include "service provided after successful booking" and "service not provided after successful booking"; "service not provided after successful booking" refers to a successful booking that is canceled during service.

(b2) Obtain reservation feature sample data for each historical reservation service order sample, where the reservation characteristic sample data contains the same indicators as those included in the reservation feature data obtained in step 201 and serves only as sample data herein.

(b3) Perform multi-scale time series feature fusion on a sample time series of accepted-order quantities, a sample time series of during-service cancellation quantities, a sample time series of rejection quantities, a sample time series of attention levels for the reservation platform, and a sample time attribute series to derive a sample comprehensive time series feature representation. The multi-scale time series feature fusion process here is the same as that described above. Reference can be made to the foregoing fusion process, and details are not described herein again.

(b4) Train the auxiliary rejection prediction model by using service provider feature sample information, user reservation feature sample information, and statistical non-time series sample data for each historical reservation service order sample as input and the booking labels corresponding to each historical reservation service order sample as label data.

(b5) Train the main cancellation prediction model by using the sample comprehensive time series feature representation, the service provider feature sample information, the user reservation feature sample information, and the statistical non-time series sample data for each historical reservation service order sample as well as sample rejection prediction results from the auxiliary rejection prediction model as input and the service labels corresponding to each historical reservation service order sample as label data.

(b6) Calculate an overall loss error of the multi-task learning prediction network, where the overall loss error includes a loss error from an auxiliary rejection task and a loss error from a main cancellation task. The overall loss error is expressed as follows:

$$\text{Loss} = L_{nr} + \alpha * L_{rf};$$

$$\text{where } L_{rf} = \sum\nolimits_{i=1}^{N} I_{ri} * (y_{ri} * \log(y'_{ri}) + (1 - y_{ri})\log(1 - y'_{ri}));$$

$$L_{nr} = \sum\nolimits_{i=1}^{N} I_{ni} * (y_{ni} * \log(y'_{ni}) + (1 - y_{ni})\log(1 - y'_{ni}));$$

where Loss represents the overall loss error; $L_{rf}$ represents the loss error from the auxiliary rejection task; $L_{nr}$ represents the loss error from the main cancellation task (corresponding to the unavailable-upon-arrival main loss in FIG. 2); a represents an auxiliary task weight, which can be set to 0.1; $y_{ri}$ represents an actual rejection result for an i-th historical reservation service order sample; $y_{ri}'$ represents a predicted rejection result for the i-th historical reservation service order sample; $y_{ni}$ represents an actual cancellation result for the i-th historical reservation service order sample; $y_{ni}'$ represents a predicted cancellation result for the i-th historical reservation service order sample; $I_{ri}$ indicates whether the i-th historical reservation service order sample is a booking-unsuccessful sample, a value of $I_{ri}$ being 0 or 1; $I_{ni}$ indicates whether the i-th historical reservation service order sample is a service-not-provided-after-successful-booking sample, a value of $I_{ni}$ being 0 or 1; and N represents the number of samples.

(b7) When the overall loss error converges or a preset maximum training iteration count is reached, obtain a trained multi-task learning prediction network.

To address the issue of data sparsity for during-service cancellations that leads to inaccuracies in cancellation prediction results, the present disclosure, on one hand, involves obtaining statistical time series data and statistical non-time series data as input data for cancellation prediction and further performing multi-scale time series feature fusion on the various time series of the statistical time series data to capture features across different scales, thus improving the accuracy of cancellation predictions. On the other hand, an auxiliary rejection prediction model is introduced based on the main cancellation prediction model, using output from the auxiliary rejection prediction model as input for the main cancellation prediction model. During training, the overall loss error is constructed using both the rejection loss error and the cancellation loss error, which allows for the adjustment of model parameters for the cancellation prediction model based on the overall loss error, thereby ensuring prediction precision of the trained main cancellation prediction model.

The following provides verification results validating the accuracy of the cancellation prediction method of the present disclosure. Reservation service order data within 3 months from an online booking platform is collected as samples, with a total sample (order) count of approximately ten million, and the number of successful bookings that are canceled during service amounts to the tens of thousands.

The models involved in the comparison include: M1: simple MLP model that does not utilize any time series features; M2: LSTM+MLP model, where the time series features are processed using a basic LSTM model; M3: LAXCAT+MLP model, where the time series features are processed using the LAXCAT model; M4: DARNN+MLP model, where the time series features are processed using the DARNN model.

A comparison metric is an Area Under Curve (AUC). The AUC is defined as an area under a receiver operating characteristic (ROC) curve, with a larger AUC value indicating a better model performance.

TABLE 1

| Performance comparison of different models under single task and multi-task | | |
| --- | --- | --- |
| Model | Only using a cancellation prediction network | Combined with a rejection auxiliary network |
| M1 | 0.911 | 0.918 |
| M2 | 0.915 | 0.921 |
| M3 | 0.916 | 0.922 |
| M4 | 0.918 | 0.924 |
| Multi-task learning prediction network of the present disclosure | 0.924 | 0.929 |

TABLE 2

| Performance comparison of different single-scale time series features and multi-scale time series feature fusion | |
| --- | --- |
| Convolution scale | AUC |
| Only using scale-3 (i.e., convolution kernel = 3) | 0.925 |
| Only using scale-7 (i.e., convolution kernel = 7) | 0.926 |
| Only using scale-14 (i.e., convolution kernel = 14) | 0.924 |
| Only using scale-28 (i.e., convolution kernel = 28) | 0.924 |
| Fusion using four scales as described in the present disclosure | 0.929 |

TABLE 3

| Performance comparison of different time attention methods | |
| --- | --- |
| Attention method | AUC |
| Time attention using existing attention method from LAXCAT paper | 0.925 |
| Time attention using method proposed by the present disclosure | 0.929 |

To demonstrate the superiority of the method of the present disclosure, comparative experiments were conducted on real datasets against other advanced methods, with the results shown in Tables 1, 2, and 3. From Table 1, it can be observed that introducing the auxiliary rejection task on top of the single task models leads to significant improvements, and the multi-task learning prediction network proposed in the present disclosure achieves the best performance. In Table 2, although the multi-scale fusion representation method does not perform exceptionally, showing only a slight advantage over single-scale fusion representations, it reduces the amount of work required for optimizing model parameters across multiple scales. In the case of single-scale approaches, it is necessary to select a kernel size among 3, 7, 14, and 18 for testing, while multi-scale approaches can directly use the fused representation without parameter tuning for kernel size. Therefore, the multi-scale fusion representation method demonstrates practical significance. In Table 3, the attention method from the LAXCAT paper (Hsieh, Tsung-Yu, et al. "*Explainable multivariate time series classification: a deep neural network that learns to attend to important variables as well as time intervals.*" *Proceedings of the* 14*th ACM International Conference on Web Search and Data Mining,* 2021) employs a purely parameterized learning method for attention, meaning the attention query is obtained through pure parameter learning. In contrast, the attention query of the present disclosure uses reservation feature information, such as implicit relationships between service dates of order samples and dates corresponding to each time step in the time series, resulting in better performance.

The present disclosure also provides an application scenario where the aforementioned method for predicting cancellations of reservation services based on fusion of multi-scale time series features is applied. Specifically, the method for predicting cancellations of reservation services based on fusion of multi-scale time series features provided in this embodiment can be utilized in various service reservation scenarios in everyday life. For example, the method can be applied to restaurant reservations on platforms like Meituan and Dianping, or homestay reservations on Airbnb. These scenarios encompass phases such as service message publishing, service booking, and cancellation prediction. Service providers publish services on the platform, and users make service reservations through the platform. After a service provider confirms acceptance of a user reservation, the present disclosure predicts the probability that the user reservation will be canceled on the booking date, allowing for proactive measures to protect users' rights. The method for predicting cancellations of reservation services based on fusion of multi-scale time series features provided in this embodiment pertains to the cancellation prediction phase.

Embodiment 2

This embodiment provides a computer device, including a memory, a processor, and a computer program stored in the memory, where the processor executes the computer program to implement the method for predicting cancellations of reservation services based on fusion of multi-scale time series features in Embodiment 1.

Embodiment 3

This embodiment provides a computer readable storage medium storing a computer program, where the computer program, when executed by a processor, implements the method for predicting cancellations of reservation services based on fusion of multi-scale time series features in Embodiment 1.

Embodiment 4

This embodiment provides a computer program storing a computer program, where the computer program, when executed by a processor, implements the method for predicting cancellations of reservation services based on fusion of multi-scale time series features in Embodiment 1.

Several examples are used herein for illustration of the principles and implementations of the present disclosure. The description of the foregoing examples is used to help illustrate the method of the present disclosure and the core principles thereof. In addition, those of ordinary skill in the art can make various modifications in terms of specific implementations and scope of application in accordance with the teachings of the present disclosure. In conclusion, the content of the present specification shall not be construed as a limitation to this application.

What is claimed is:

1. A method for predicting cancellations of reservation services based on fusion of multi-scale time series features, comprising:

obtaining reservation feature data of a reservation service order to be predicted, wherein the reservation feature data comprises service provider feature information, user reservation feature information, statistical time series data, and statistical non-time series data; the statistical time series data comprises a time series of accepted-order quantities, a time series of during-service cancellation quantities, a time series of rejection quantities, a time series of attention levels for a reservation platform, and a time attribute series, that are all within a first preset time period prior to a reservation service time point of the reservation service order to be predicted, wherein a time attribute refers to a combination of a day of a week and whether it is a holiday or not; and the statistical non-time series data comprises total order quantities, total during-service cancellation quantities, total rejection quantities, and total attention levels for the reservation platform, all within a second preset time period prior to the service time point of the reservation order to be predicted;

performing multi-scale time series feature fusion on the time series of accepted-order quantities, the time series of during-service cancellation quantities, the time series of rejection quantities, the time series of attention levels for the reservation platform, and the time attribute series, to obtain a comprehensive time series feature representation;

inputting the service provider feature information, the user reservation feature information, and the statistical non-time series data into a trained auxiliary rejection prediction model, to obtain a rejection prediction result of the reservation service order to be predicted; and inputting the comprehensive time series feature representation, the service provider feature information, the user reservation feature information, the statistical non-time series data, and the rejection prediction result into a trained main cancellation prediction model, to obtain a during-service cancellation prediction result for the reservation service order to be predicted, wherein the auxiliary rejection prediction model and the main cancellation prediction model are machine learning models.

2. The method for predicting cancellations of reservation services based on fusion of multi-scale time series features according to claim 1, wherein the accepted-order quantity refers to the number of reservation service orders agreed upon by a service provider; the during-service cancellation quantity refers to the number of reservation service orders agreed upon by the service provider and then canceled by the service provider before service; and the rejection quantity refers to the number of reservation service orders that are not agreed upon by the service provider; the attention level for the reservation platform refers to a frequency with which the service provider maintains a reservation inventory on the reservation platform.

3. The method for predicting cancellations of reservation services based on fusion of multi-scale time series features according to claim 1, wherein said performing multi-scale time series feature fusion on the time series of accepted-order quantities, the time series of during-service cancellation quantities, the time series of rejection quantities, the time series of attention levels for the reservation platform, and the time attribute series to obtain the comprehensive time series feature representation specifically comprises:

for each of the time series of accepted-order quantities, the time series of during-service cancellation quantities, the time series of rejection quantities, the time series of attention levels for the reservation platform, and the time attribute series, performing convolution processing using J convolution kernels of different sizes, to obtain J convolution result matrices for each time series;

fusing the convolution result matrices corresponding to the same convolution kernel, to obtain a single-scale fusion matrix corresponding to each convolution kernel;

padding the single-scale fusion matrices corresponding to the J convolution kernels, to obtain J padded fusion matrices of equal sizes;

combining vectors of the same row in the J padded fusion matrices, to obtain a plurality of cross-scale combination matrices;

based on each of the cross-scale combination matrices, performing cross-scale fusion by using an attention mechanism, to obtain a cross-scale fusion matrix; and performing time-dimension weighted fusion on the cross-scale fusion matrix by using the attention mechanism, to obtain the comprehensive time series feature representation.

4. The method for predicting cancellations of reservation services based on fusion of multi-scale time series features according to claim 3, wherein the cross-scale fusion matrix is expressed as follows:

$$\tilde{S} = \left(\tilde{s}_1, \tilde{s}_2, \ldots, \tilde{s}_t, \ldots, \tilde{s}_{L_M}\right);$$

-continued wherein $\tilde{s}_t = \sum_{j=1}^{J} \alpha_{tj}\tilde{g}_{tj}$;

$\tilde{S}$ represents the cross-scale fusion matrix; j represents a j-th convolution kernel; $L_M$ represents a maximum time step after padding; $\tilde{g}_{tj}$ represents a 1-th row in a padded fusion matrix $\tilde{G}_j$ corresponding to the j-th convolution kernel, $\tilde{G}_j=(\tilde{g}_{1j}, \tilde{g}_{2j}, \ldots, \tilde{g}_{tj}, \ldots, \tilde{g}_{L_{Mj}})$, and the t-th row in $\tilde{G}_j$ represents a feature vector under the t-th time step; $\alpha_{tj}$ represents a j-th element of $\alpha_t$, $\alpha_t$=softmax(score$_t$), and score$_t$=f$_2$(f$_1$(W$_1\hat{G}_t$+B$_1$)W2+B$_2$); $\hat{G}_t$=($\tilde{g}_{t1}$; $\tilde{g}_{t2}$, . . . , $\tilde{g}_{tj}$, . . . , $\tilde{g}_{tJ}$) represents a cross-scale combination matrix obtained after vectors of the t-th row in each $\tilde{G}_j$ are combined; f$_1$(•) and f$_2$(•) are activation functions; W$_1$, W2, B$_1$, B$_2$ represent weight coefficients; and J represents the number of types of the convolution kernels.

5. The method for predicting cancellations of reservation services based on fusion of multi-scale time series features according to claim 4, wherein the comprehensive time series feature representation is expressed as follows:

$$V = \sum_{t=1}^{L_M} \beta_t \tilde{s}_t;$$

wherein V represents the comprehensive time series feature representation; $\beta_t$ represents a t-th element in $\beta$, $\beta$=softmax(z), and z=MLP(concat($\tilde{S}$, $\tilde{Q}$)); $\tilde{Q}$=[Q]*$L_M$, and Q represents a query in the attention mechanism, represented using the user reservation feature information; concat( ) represents concatenation; and MLP represents a perceptron.

6. The method for predicting cancellations of reservation services based on fusion of multi-scale time series features according to claim 1, wherein before the step of inputting the service provider feature information, the user reservation feature information, and the statistical non-time series data into the trained auxiliary rejection prediction model, the method further comprises: training a multi-task learning prediction network, wherein the multi-task learning prediction network comprises the main cancellation prediction model and the auxiliary rejection prediction model, and a training process specifically comprises:

obtaining a historical reservation service order sample set and label data corresponding to each historical reservation service order sample, wherein the label data comprises booking labels and service labels: the booking labels comprise "booking successful" and "booking unsuccessful"; the service labels comprise "service provided after successful booking" and "service not provided after successful booking"; "service not provided after successful booking" refers to a successful booking that is canceled during service;

obtaining reservation feature sample data for each historical reservation service order sample;

performing multi-scale time series feature fusion on a sample time series of accepted-order quantities, a sample time series of during-service cancellation quantities, a sample time series of rejection quantities, a sample time series of attention levels for the reservation platform, and a sample time attribute series to derive a sample comprehensive time series feature representation;

training the auxiliary rejection prediction model by using service provider feature sample information, user reservation feature sample information, and statistical non-time series sample data for each historical reservation service order sample as input and the booking labels corresponding to each historical reservation service order sample as label data;

training the main cancellation prediction model by using the sample comprehensive time series feature representation, the service provider feature sample information, the user reservation feature sample information, and the statistical non-time series sample data for each historical reservation service order sample as well as sample rejection prediction results from the auxiliary rejection prediction model as input and the service labels corresponding to each historical reservation service order sample as label data;

calculating an overall loss error of the multi-task learning prediction network, wherein the overall loss error comprises a loss error from an auxiliary rejection task and a loss error from a main cancellation task; and when the overall loss error converges or a preset maximum training iteration count is reached, obtaining a trained multi-task learning prediction network.

7. The method for predicting cancellations of reservation services based on fusion of multi-scale time series features according to claim 6, wherein the overall loss error is expressed as follows:

$$\text{Loss} = L_{nr} + \alpha * L_{rf};$$

$$\text{wherein } L_{rf} = \sum_{i=1}^{N} I_{ri} * (y_{ri} * \log(y'_{ri}) + (1 - y_{ri})\log(1 - y'_{ri}));$$

$$L_{nr} = \sum_{i=1}^{N} I_{ni} * (y_{ni} * \log(y'_{ni}) + (1 - y_{ni})\log(1 - y'_{ni}));$$

wherein Loss represents the overall loss error; $L_{rf}$ represents the loss error from the auxiliary rejection task; $L_{nr}$ represents the loss error from the main cancellation task; $\alpha$ represents an auxiliary task weight; $y_{ri}$ represents an actual rejection result for an i-th historical reservation service order sample;

$$y'_{ri}$$

represents a predicted rejection result for the i-th historical reservation service order sample; $y_{ni}$ represents an actual cancellation result for the i-th historical reservation service order sample;

$$y'_{ni}$$

represents a predicted cancellation result for the i-th historical reservation service order sample; $I_{ri}$ indicates whether the i-th historical reservation service order sample is a booking-unsuccessful sample; $I_{ni}$ indicates whether the i-th historical is a reservation service order sample service-not-provided-after-successful-booking sample; and N represents the number of samples.

8. A computer apparatus, comprising a memory, a processor, and a computer program stored in the memory and executable on the processor, wherein the processor executes the computer program to implement the method for predicting cancellations of reservation services based on fusion of multi-scale time series features according to claim 1.

9. A non-transitory computer-readable storage medium, which stores a computer program, wherein the computer program, when executed by a processor, implements the method for predicting cancellations of reservation services based on fusion of multi-scale time series features according to claim 1.

10. The computer apparatus according to claim 8, wherein the accepted-order quantity refers to the number of reservation service orders agreed upon by a service provider; the during-service cancellation quantity refers to the number of reservation service orders agreed upon by the service provider and then canceled by the service provider before service; and the rejection quantity refers to the number of reservation service orders that are not agreed upon by the service provider; the attention level for the reservation platform refers to a frequency with which the service provider maintains a reservation inventory on the reservation platform.

11. The computer apparatus according to claim 8, wherein said performing multi-scale time series feature fusion on the time series of accepted-order quantities, the time series of during-service cancellation quantities, the time series of rejection quantities, the time series of attention levels for the reservation platform, and the time attribute series to obtain the comprehensive time series feature representation specifically comprises:

for each of the time series of accepted-order quantities, the time series of during-service cancellation quantities, the time series of rejection quantities, the time series of attention levels for the reservation platform, and the time attribute series, performing convolution processing using J convolution kernels of different sizes, to obtain J convolution result matrices for each time series;

fusing the convolution result matrices corresponding to the same convolution kernel, to obtain a single-scale fusion matrix corresponding to each convolution kernel;

padding the single-scale fusion matrices corresponding to the J convolution kernels, to obtain J padded fusion matrices of equal sizes;

combining vectors of the same row in the J padded fusion matrices, to obtain a plurality of cross-scale combination matrices;

based on each of the cross-scale combination matrices, performing cross-scale fusion by using an attention mechanism, to obtain a cross-scale fusion matrix; and performing time-dimension weighted fusion on the cross-scale fusion matrix by using the attention mechanism, to obtain the comprehensive time series feature representation.

12. The computer apparatus according to claim 11, wherein the cross-scale fusion matrix is expressed as follows:

$$\tilde{S} = (\tilde{s}_1, \tilde{s}_2, \ldots, \tilde{s}_t, \ldots, \tilde{s}_{L_M});$$

$$\text{wherein } \tilde{s}_t = \sum_{j=1}^{J} \alpha_{tj}\tilde{g}_{tj};$$

$\tilde{S}$ represents the cross-scale fusion matrix; j represents a j-th convolution kernel; $L_M$ represents a maximum time step after padding; $\tilde{g}_{tj}$ represents a t-th row in a padded fusion matrix $\tilde{G}_j$ corresponding to the j-th convolution

16 kernel, $\tilde{G}_j = (\tilde{g}_{1j}, \tilde{g}_{2j}, \ldots, \tilde{g}_{tj}, \ldots, \tilde{g}_{L_{Mj}})$, and the t-th row in $\tilde{G}_j$ represents a feature vector under the t-th time step; $\alpha_{tj}$ represents a j-th element of $\alpha_t$, $\alpha_t$=softmax(score$_t$), and score$_t$=f$_2$(f$_1$(W$_1\hat{G}_t$+B$_1$)W2+B$_2$); $\hat{G}_t$=($\tilde{g}_{t1}, \tilde{g}_{t2}, \ldots, \tilde{g}_{tj}, \ldots, \tilde{g}_{tJ}$) represents a cross-scale combination matrix obtained after vectors of the t-th row in each $\tilde{G}_j$ are combined; f$_1$(•) and f$_2$(•) are activation functions; W$_1$, W2, B$_1$, B$_2$ represent weight coefficients; and J represents the number of types of the convolution kernels.

13. The computer apparatus according to claim 12, wherein the comprehensive time series feature representation is expressed as follows:

$$V = \sum_{t=1}^{L_M} \beta_t\tilde{s}_t;$$

wherein V represents the comprehensive time series feature representation; $\beta_t$ represents a t-th element in $\beta$, $\beta$=softmax(z), and z=MLP(concat($\tilde{S}$, $\tilde{Q}$)); $\tilde{Q}$=[Q]*L$_M$, and Q represents a query in the attention mechanism, represented using the user reservation feature information; concat( ) represents concatenation; and MLP represents a perceptron.

14. The computer apparatus according to claim 8, wherein before the step of inputting the service provider feature information, the user reservation feature information, and the statistical non-time series data into the trained auxiliary rejection prediction model, the method further comprises: training a multi-task learning prediction network, wherein the multi-task learning prediction network comprises the main cancellation prediction model and the auxiliary rejection prediction model, and a training process specifically comprises:

obtaining a historical reservation service order sample set and label data corresponding to each historical reservation service order sample, wherein the label data comprises booking labels and service labels: the booking labels comprise "booking successful" and "booking unsuccessful"; the service labels comprise "service provided after successful booking" and "service not provided after successful booking"; "service not provided after successful booking" refers to a successful booking that is canceled during service;

obtaining reservation feature sample data for each historical reservation service order sample;

performing multi-scale time series feature fusion on a sample time series of accepted-order quantities, a sample time series of during-service cancellation quantities, a sample time series of rejection quantities, a sample time series of attention levels for the reservation platform, and a sample time attribute series to derive a sample comprehensive time series feature representation;

training the auxiliary rejection prediction model by using service provider feature sample information, user reservation feature sample information, and statistical non-time series sample data for each historical reservation service order sample as input and the booking labels corresponding to each historical reservation service order sample as label data;

training the main cancellation prediction model by using the sample comprehensive time series feature representation, the service provider feature sample information, the user reservation feature sample information, and the statistical non-time series sample data for each historical reservation service order sample as well as sample rejection prediction results from the auxiliary rejection prediction model as input and the service labels corresponding to each historical reservation service order sample as label data;

calculating an overall loss error of the multi-task learning prediction network, wherein the overall loss error comprises a loss error from an auxiliary rejection task and a loss error from a main cancellation task; and when the overall loss error converges or a preset maximum training iteration count is reached, obtaining a trained multi-task learning prediction network.

15. The computer apparatus according to claim 14, wherein the overall loss error is expressed as follows:

$$\text{Loss} = L_{nr} + \alpha * L_{rf};$$

$$\text{wherein } L_{rf} = \sum_{i=1}^{N} I_{ri} * (y_{ri} * \log(y'_{ri}) + (1 - y_{ri})\log(1 - y'_{ri}));$$

$$L_{nr} = \sum_{i=1}^{N} I_{ni} * (y_{ni} * \log(y'_{ni}) + (1 - y_{ni})\log(1 - y'_{ni}));$$

wherein Loss represents the overall loss error; $L_{rf}$ represents the loss error from the auxiliary rejection task; $L_{nr}$ represents the loss error from the main cancellation task; $\alpha$ represents an auxiliary task weight; $y_{ri}$ represents an actual rejection result for an i-th historical reservation service order sample; $y_{ri}'$ represents a predicted rejection result for the i-th historical reservation service order sample; $y_{ni}$ represents an actual cancellation result for the i-th historical reservation service order sample;

$$y'_{ni}$$

represents a predicted cancellation result for the i-th historical reservation service order sample; $I_{ri}$ indicates whether the i-th historical reservation service order sample is a booking-unsuccessful sample; $I_{ni}$ indicates whether the i-th historical reservation service order sample is a service-not-provided-after-successful-booking sample; and N represents the number of samples.

16. The non-transitory computer-readable storage medium according to claim 9, wherein the accepted-order quantity refers to the number of reservation service orders agreed upon by a service provider; the during-service cancellation quantity refers to the number of reservation service orders agreed upon by the service provider and then canceled by the service provider before service; and the rejection quantity refers to the number of reservation service orders that are not agreed upon by the service provider; the attention level for the reservation platform refers to a frequency with which the service provider maintains a reservation inventory on the reservation platform.

17. The non-transitory computer-readable storage medium according to claim 9, wherein said performing multi-scale time series feature fusion on the time series of accepted-order quantities, the time series of during-service cancellation quantities, the time series of rejection quantities, the time series of attention levels for the reservation platform, and the time attribute series to obtain the comprehensive time series feature representation specifically comprises:

for each of the time series of accepted-order quantities, the time series of during-service cancellation quantities, the time series of rejection quantities, the time series of attention levels for the reservation platform, and the time attribute series, performing convolution processing using J convolution kernels of different sizes, to obtain J convolution result matrices for each time series;

fusing the convolution result matrices corresponding to the same convolution kernel, to obtain a single-scale fusion matrix corresponding to each convolution kernel;

padding the single-scale fusion matrices corresponding to the J convolution kernels, to obtain J padded fusion matrices of equal sizes;

combining vectors of the same row in the J padded fusion matrices, to obtain a plurality of cross-scale combination matrices;

based on each of the cross-scale combination matrices, performing cross-scale fusion by using an attention mechanism, to obtain a cross-scale fusion matrix; and performing time-dimension weighted fusion on the cross-scale fusion matrix by using the attention mechanism, to obtain the comprehensive time series feature representation.

18. The non-transitory computer-readable storage medium according to claim 17, wherein the cross-scale fusion matrix is expressed as follows:

$$\tilde{S} = (\tilde{s}_1, \tilde{s}_2, \ldots, \tilde{s}_t, \ldots, \tilde{s}_{L_M});$$

$$\text{wherein } \tilde{s}_t = \sum_{j=1}^{J} \alpha_{tj} \tilde{g}_{tj};$$

$\tilde{S}$ represents the cross-scale fusion matrix; j represents a j-th convolution kernel; $L_M$ represents a maximum time step after padding; $\tilde{g}_{tj}$ represents a t-th row in a padded fusion matrix $\tilde{G}_j$ corresponding to the j-th convolution kernel, $\tilde{G}_j = (\tilde{g}_{1j}, \tilde{g}_{2j}, \ldots, \tilde{g}_{tj}, \ldots, \tilde{g}_{L_{Mj}})$, and the t-th row in $\tilde{G}_j$ represents a feature vector under the t-th time step; $\alpha_{tj}$ represents a j-th element of $\alpha_t$, $\alpha_t = \text{softmax}(\text{score}_t)$, and $\text{score}_t = f_2(f_1(W_1 \hat{G}_t + B_1)W2 + B_2)$; $\hat{G}_t = (\tilde{g}_{t1}, \tilde{g}_{t2}, \ldots, \tilde{g}_{tj}, \ldots, \tilde{g}_{tJ})$ represents a cross-scale combination matrix obtained after vectors of the t-th row in each $\tilde{G}_j$ are combined; $f_1(\cdot)$ and $f_2(\cdot)$ are activation functions; $W_1$, W2, $B_1$, $B_2$ represent weight coefficients; and J represents the number of types of the convolution kernels.

19. The non-transitory computer-readable storage medium according to claim 18, wherein the comprehensive time series feature representation is expressed as follows:

$$V = \sum_{t=1}^{L_M} \beta_t \tilde{s}_t;$$

wherein V represents the comprehensive time series feature representation; $\beta_t$ represents a t-th element in $\beta$, $\beta = \text{softmax}(z)$, and $z = \text{MLP}(\text{concat}(\tilde{S}, \tilde{Q}))$; $\tilde{Q} = [Q]*L_M$, and Q represents a query in the attention mechanism, represented using the user reservation feature information; concat( ) represents concatenation; and MLP represents a perceptron.

20. The non-transitory computer-readable storage medium according to claim 9, wherein before the step of inputting the service provider feature information, the user reservation feature information, and the statistical non-time series data into the trained auxiliary rejection prediction model, the method further comprises: training a multi-task learning prediction network, wherein the multi-task learning prediction network comprises the main cancellation prediction model and the auxiliary rejection prediction model, and a training process specifically comprises:

obtaining a historical reservation service order sample set and label data corresponding to each historical reservation service order sample, wherein the label data comprises booking labels and service labels: the booking labels comprise "booking successful" and "booking unsuccessful"; the service labels comprise "service provided after successful booking" and "service not provided after successful booking"; "service not provided after successful booking" refers to a successful booking that is canceled during service;

obtaining reservation feature sample data for each historical reservation service order sample;

performing multi-scale time series feature fusion on a sample time series of accepted-order quantities, a sample time series of during-service cancellation quantities, a sample time series of rejection quantities, a sample time series of attention levels for the reservation platform, and a sample time attribute series to derive a sample comprehensive time series feature representation;

training the auxiliary rejection prediction model by using service provider feature sample information, user reservation feature sample information, and statistical non-time series sample data for each historical reservation service order sample as input and the booking labels corresponding to each historical reservation service order sample as label data;

training the main cancellation prediction model by using the sample comprehensive time series feature representation, the service provider feature sample information, the user reservation feature sample information, and the statistical non-time series sample data for each historical reservation service order sample as well as sample rejection prediction results from the auxiliary rejection prediction model as input and the service labels corresponding to each historical reservation service order sample as label data;

calculating an overall loss error of the multi-task learning prediction network, wherein the overall loss error comprises a loss error from an auxiliary rejection task and a loss error from a main cancellation task; and when the overall loss error converges or a preset maximum training iteration count is reached, obtaining a trained multi-task learning prediction network.

\* \* \* \* \*